(12) United States Patent  
Farley

(10) Patent No.: US 8,051,988 B2
(45) Date of Patent: Nov. 8, 2011

(54) GRAIN CONVEYOR APPARATUS AND SYSTEM INCLUDING SEPARATION CAPABILITY

(75) Inventor: Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 12 days.

(21) Appl. No.: 12/603,728

(22) Filed: Oct. 22, 2009

(65) Prior Publication Data

US 2011/0094199 A1    Apr. 28, 2011

(51) Int. Cl.
*B07B 1/24*    (2006.01)

(52) U.S. Cl. ......... 209/293; 209/274; 209/298; 460/101

(58) Field of Classification Search ............. 209/274, 209/279, 288, 293, 294, 298; 460/101, 102
See application file for complete search history.

(56) References Cited

U.S. PATENT DOCUMENTS

| | | | |
|---|---|---|---|
| 1,386,298 A * | 8/1921 | Winslow | 209/289 |
| 1,533,997 A * | 4/1925 | Stinson | 209/284 |
| 2,833,410 A | 5/1958 | Sisulak et al. | |
| 2,861,298 A | 11/1958 | Fowler | |
| 3,401,727 A | 9/1968 | Blanshine et al. | |
| 3,672,504 A * | 6/1972 | Grimes, Jr. | 209/255 |
| 3,756,406 A * | 9/1973 | Khan | 209/291 |
| 3,815,737 A * | 6/1974 | Katter | 209/44 |
| 3,886,951 A | 6/1975 | McRobert | |
| 4,083,775 A * | 4/1978 | Stewart et al. | 209/257 |
| 4,159,023 A * | 6/1979 | Todd et al. | 460/70 |
| 4,159,242 A * | 6/1979 | Walker | 209/44 |
| 4,178,942 A * | 12/1979 | Nusser | 460/80 |
| 4,600,019 A | 7/1986 | McBroom | |
| 5,045,025 A * | 9/1991 | Underwood | 460/66 |
| 5,256,106 A | 10/1993 | Shrawder | |
| RE34,458 E * | 11/1993 | Fahrenholz | 241/74 |
| 5,398,814 A * | 3/1995 | Sime | 209/285 |
| 5,752,435 A * | 5/1998 | Wai | 99/567 |
| 5,941,768 A | 8/1999 | Flamme | |
| 6,358,141 B1 | 3/2002 | Stukenholtz et al. | |
| 6,475,082 B2 | 11/2002 | Visagie | |
| 6,500,062 B1 | 12/2002 | Harris et al. | |
| 6,602,130 B1 * | 8/2003 | Manning et al. | 460/100 |

* cited by examiner

*Primary Examiner* — Joseph C Rodriguez

(74) *Attorney, Agent, or Firm* — Michael G. Harms; Sue C. Watson

(57) ABSTRACT

A grain conveying apparatus and system for conveying and separating elements of a grain mixture of a first minimum size, such as cob pieces, and a second maximum size smaller than the first minimum size, such as grain or corn, including an upper passage having at least one aperture generally smaller than the cob pieces and larger than the grain or corn. As the grain mixture is conveyed through the upper passage, the cob pieces will pass across the apertures, and the grain or corn will pass through the apertures to the lower passage thereby separating the elements of the grain mixture as it is conveyed from a source bin to separate receiving bins.

20 Claims, 6 Drawing Sheets

GRAIN CONVEYOR APPARATUS AND SYSTEM INCLUDING SEPARATION CAPABILITY

TECHNICAL FIELD

The present invention relates to a grain conveying apparatus and system for conveying a grain mixture including cob pieces and grain, which apparatus and system more particularly incorporates a capability for separating the cob pieces and grain as the mixture is conveyed from a source bin to separate receiving bins.

BACKGROUND ART

Presently, there is an increased demand for corn cobs as a feedstock for cellulosic ethanol, as well as other uses. As a result, there is heightened interest in collecting corn cobs during corn harvest. To this end, agricultural harvesters are now harvesting and collecting shelled corn as well as pieces of cob and discharging the remaining crop residue or stover, e.g., corn stalks, leaves, and husks, onto the field. In many cases, the grain bin of the harvester will contain a mixture including a significant amount of cob pieces collected with the grain.

Storing a mixture of grain and cob pieces is disadvantageous because the cob pieces are generally larger and lighter than the grain. Harvester grain bins fill more inefficiently and require more frequent unloading, and transferring the mixture of grain and cob pieces between containers creates a risk of damage to both elements. As the mixture is discharged to the receiving container, gravitational forces will likely cause the denser grain elements to fall at a greater velocity, relative to the larger, lighter cob pieces. This may result in breakage of the cob pieces, resulting in a loss of moisture, or may otherwise damage the grain. Therefore it would be advantageous to separate the mixture into a grain receiving container and a cob receiving container as soon as possible, preferably as the mixture is unloaded from the harvester.

Thus, what is sought is a grain conveying apparatus and system including separation capabilities which provides one or more of the capabilities, and overcomes one or more of the shortcomings and limitations, set forth above.

SUMMARY OF THE INVENTION

According to the present invention, what is provided a grain conveying apparatus and system including separation capabilities which provides one or more of the capabilities, and overcomes one or more of the shortcomings and limitations, set forth above.

According to the present invention, a grain conveying apparatus and system is provided for conveying and separating elements of a grain mixture of at least a first minimum size, such as cob pieces, and a second maximum size smaller than the first minimum size, such as grain or corn. The grain conveying apparatus and system includes a structure defining an upper passage containing a first conveyance device configured and operable for conveying the grain mixture in a first direction within the upper passage and a structure defining a lower passage containing a second conveyance device configured and operable for conveying the elements of the grain mixture in a second direction.

In a preferred embodiment, the upper passage includes an unloading tube containing a helical auger for conveying the grain mixture over a lower region of the unloading tube in a first direction, and the lower passage includes a cylindrical outer tube. The lower region of the unloading tube includes at least one aperture of a first predetermined extent in at least one direction which is smaller than the first minimum size associated with the cob pieces and larger than the second maximum size associated with the grain. The apertures provide communication between the upper passage and lower passage.

As the grain mixture is conveyed over the lower region of the unloading tube, substantially all of the elements of the grain mixture of at least the first minimum size, the cob pieces, being larger than the than the apertures, will be conveyed across the apertures towards a first receiving bin. In contrast, substantially all of the elements of the grain mixture of the second maximum size, the grain, being smaller than the apertures, will pass through the apertures to the lower passage or the outer tube. The second conveyance device will convey the elements that have passed through the at least one aperture, namely the grain, towards a second receiving bin.

According to an aspect of the invention, the helical auger conveys the grain mixture over the lower region of the unloading tube, and the second conveyance device includes a second helical auger disposed about the first helical auger. The second helical auger may comprise a portion of the structure defining the lower passage or outer tube.

According to another aspect of the invention, the outer cylindrical tube is concentric with the inner, unloading tube and coextensive in the first direction with at least a portion of the unloading tube including the at least one aperture. The outer tube is configured and operable for rotating around the unloading tube, and at least one helical flight of the second auger is disposed on an inner surface of the outer tube. The second auger is configured and operable for conveying the elements of the grain mixture away from the at least one aperture, such that rotating the outer tube around the unloading tube will convey the elements of the grain mixture of the second maximum size, the grain, that have passed through the at least one aperture in a second direction to the second receiving bin.

According to a feature of the invention, the lower region of the unloading tube includes a plurality of apertures of the first predetermined extent in at least one direction. The plurality of apertures may form a perforated section in the lower region of an intermediate portion of the unloading tube. The intermediate portion extends between an inlet portion proximate to the source or grain bin and an outlet portion proximate the first receiving bin. After the grain mixture enters and passes through the inlet portion, the rotation of the helical auger not only transports the grain mixture through the intermediate portion, it agitates or churns the elements of the grain mixture producing a tumbling effect to promote separation of the cob pieces and the grain. The intermediate portion includes sufficient apertures for exposing substantially all of the elements of the grain mixture of the second maximum size, the grain, to the apertures as the grain mixture tumbles or churns across the perforation created by the plurality of apertures during conveyance through the intermediate portion. Elements of the grain mixture of the first minimum size, the cob pieces, will pass over the perforation created by the plurality of apertures to the outlet portion.

According to yet another aspect of the invention, an extent in the first direction of the inner unloading tube exceeds an extent in the first direction of the outer tube. Also, the extent in the first direction of outer tube is greater than an extent in the first direction of the perforated section of the unloading tube. In some situations, it is desirable for the extent of the perforated section to be as much as two thirds of the extent of the unloading tube.

According to another preferred embodiment of the present invention, the helical auger conveys the grain mixture over the lower region of the unloading tube, the lower passage includes a belt system, and the second conveyance device includes at least one belt configured and operable for conveying the elements of the grain mixture that have passed through the at least one aperture in a second direction away from the at least one aperture.

According to a feature of the invention, the belt system may enclose at least a lower portion of the unloading tube including the at least one aperture for protecting the grain passing through the apertures 28 from loss.

Preferred structures and devices of the apparatus and system include, but are not limited to, troughs, tubes, belts, rollers, augers, and the like, and those described hereinabove are exemplary rather than limiting. In addition, rotation of the outer tube around the inner tube may also be achieved using a number of known configurations including, but not limited to, support wheels, belts, and the like.

DETAILED DESCRIPTION OF THE INVENTION

Figure 1:
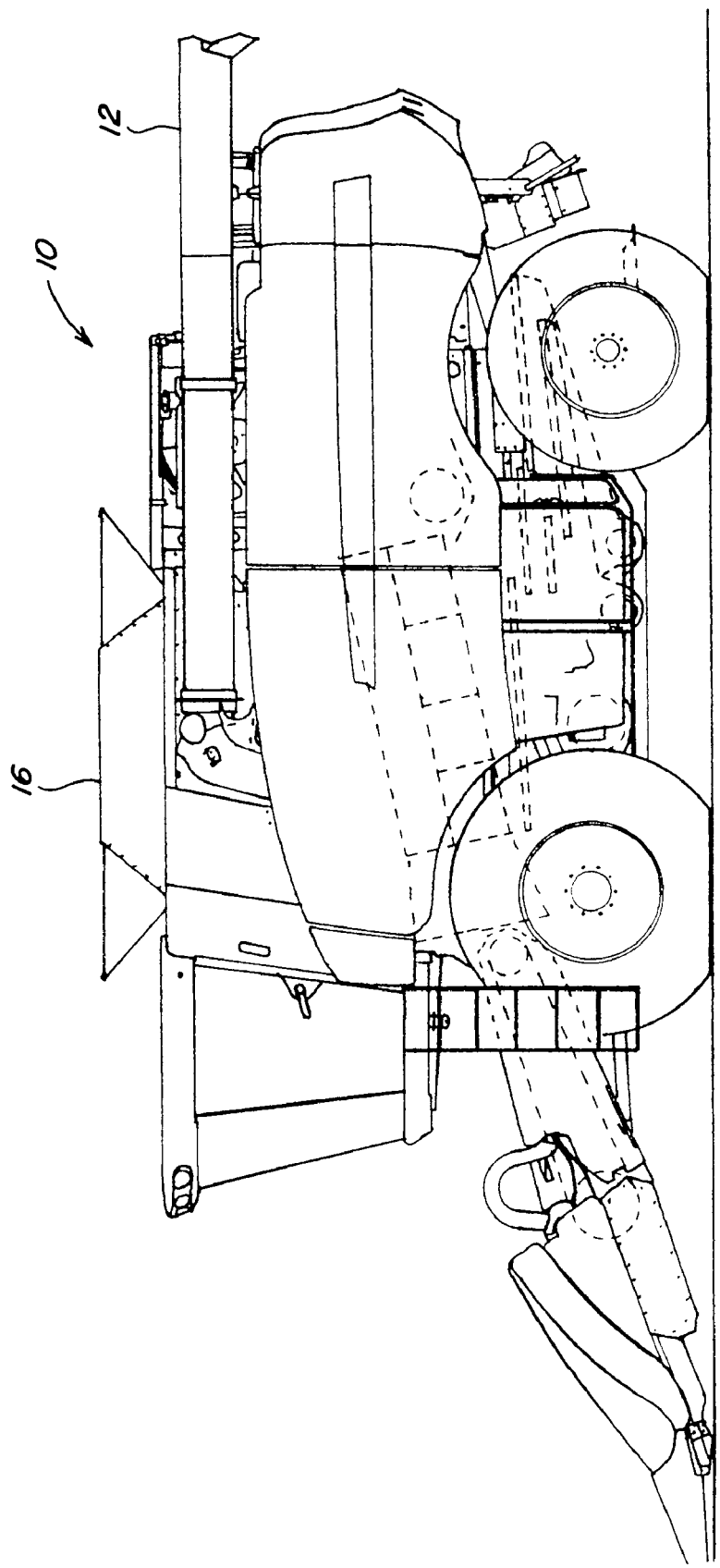
FIG. 1 is a simplified side pan view of a combine including an unloading system.
Figure 2:
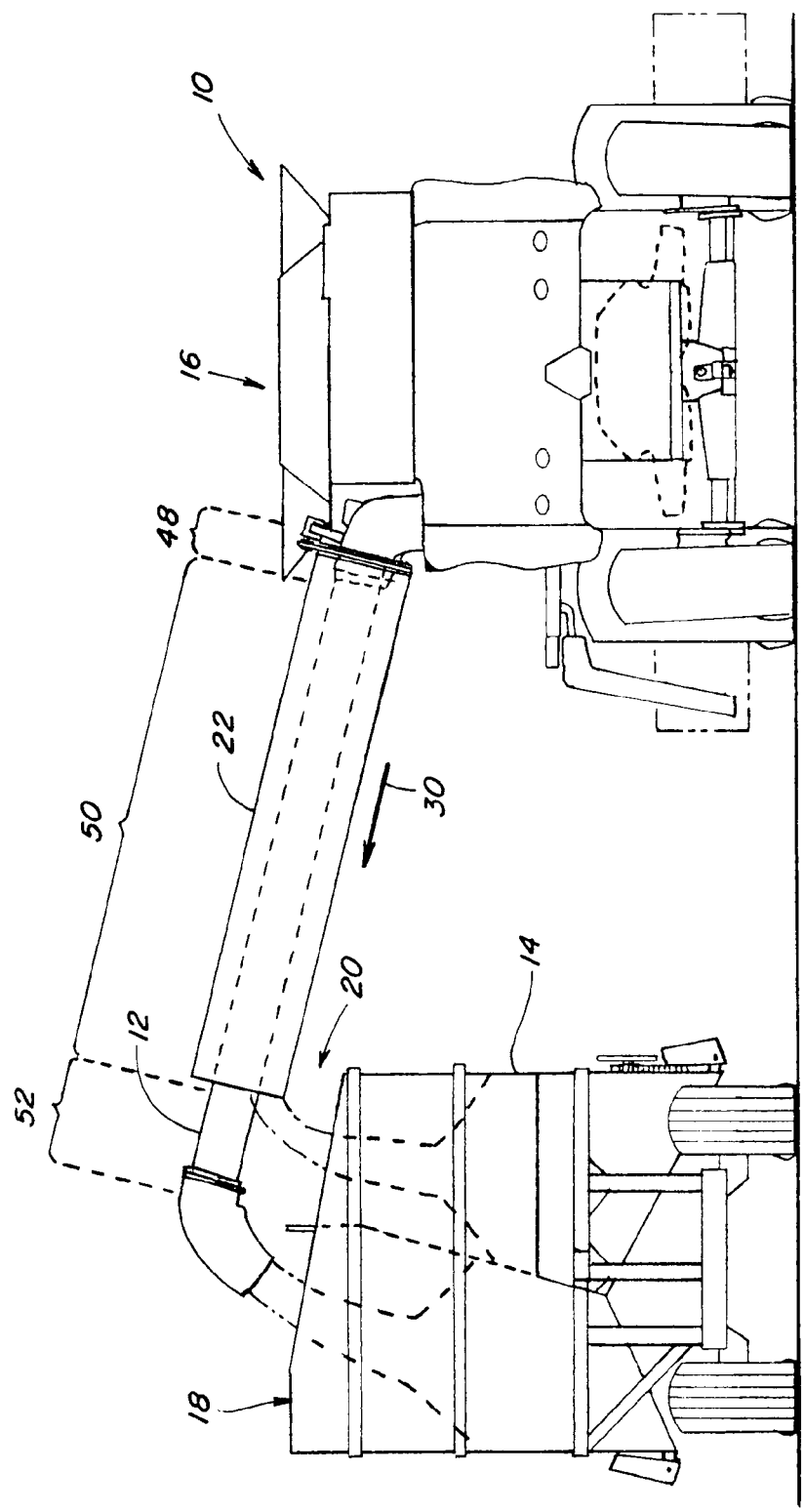
FIG. 2 is a rear view of the combine unloading grain elements according to the present invention.

Referring now to FIG. 1, a representative agricultural harvesting machine 10, which is a combine harvester of well-known construction and operation, is shown. A cylindrical shaped unloading tube 12 is shown in a stored position extending rearwardly from machine 10. In FIG. 2, unloading tube 12 is shown in a sidewardly and upwardly extending deployed or unloading position, for unloading grain from a grain bin 16 of machine 10 into an accompanying container, which here is illustrated by a conventional agricultural grain wagon 14, in the well known manner. This is intended to be representative of a wide variety of grain conveying operations, including but not limited to harvester unloading operations, wherein the content of a source bin is conveyed or directed into a receiving container, in the well known manner.

In response to a heightened interest in collecting corn cobs during harvest, many combines 10 have begun harvesting pieces of cob in addition to grain. As a result, grain bin 16 now contains a grain mixture including both larger, lighter elements of cob pieces and smaller, heavier elements of grain. In order to maintain the integrity of both elements of the grain mixture, it is desirable to separate the mixture into separate receiving containers, preferably as the mixture is unloaded from the harvester. Although explained in the context of an unloading operation wherein grain and cob pieces are conveyed and separated into a segregated grain wagon as the harvester is unloading, the present invention may also be practiced in many situations including, but not limited to, examples such as conveying the grain mixture from a source bin such as a grain elevator, or the like, and separating the elements of the grain mixture into different stand alone receiving containers.

According to the present invention, a grain conveying apparatus and system is provided for conveying and separating elements of a grain mixture of at least a first minimum size, such as cob pieces, and a second maximum size smaller than the first minimum size, such as grain or corn. As shown in FIG. 2, the grain mixture originates from a source bin, such as grain bin 16, and separated elements of the grain mixture are conveyed to a first receiving bin 18 and a second receiving bin 20.

According to a preferred embodiment, the grain conveying apparatus and system of the present invention includes a structure defining an upper passage containing a first conveyance device configured and operable for conveying the grain mixture in a first direction within the upper passage and a structure defining a lower passage containing a second conveyance device configured and operable for conveying the elements of the grain mixture in a second direction. With reference now to FIGS. 2-5, the upper passage is represented by unloading tube 12 containing helical auger 24 for conveying the grain mixture over a lower region 26 of the upper passage in a first direction, depicted by arrow 30, and the lower passage is represented by cylindrical outer tube 22. Lower region 26 of unloading tube 12 includes at least one aperture 28 of a first predetermined extent in at least one direction which is smaller than the first minimum size associated with the cob pieces and larger than the second maximum size associated with the grain. Apertures 28 provide communication between the upper passage and lower passage.

As the grain mixture is conveyed over lower region 26 of unloading tube 12, substantially all of the elements of the grain mixture of at least the first minimum size, the cob pieces, being larger than apertures 28, will be conveyed across the at least one aperture 28 towards the first receiving bin 18. In addition, substantially all of the elements of the grain mixture of the second maximum size, the grain, being smaller than the apertures 28, will pass through the at least one aperture 28 to the lower passage in which the second conveyance device carries the elements that have passed through the at least one aperture 28, namely the grain, towards second receiving bin 20.

Figure 3:
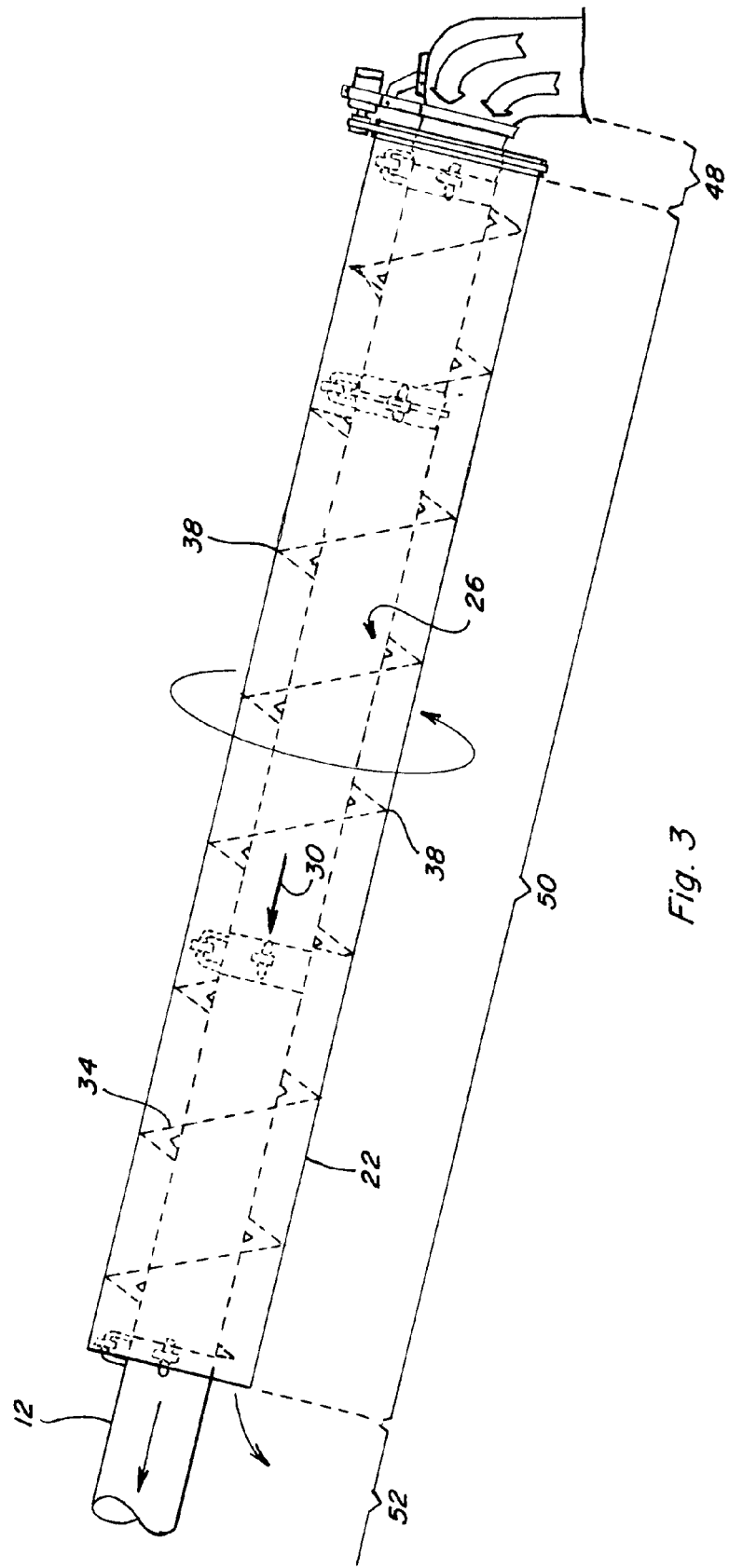
FIG. 3 is a partial side view of a preferred embodiment of the grain conveying apparatus of the present invention.
Figure 4:
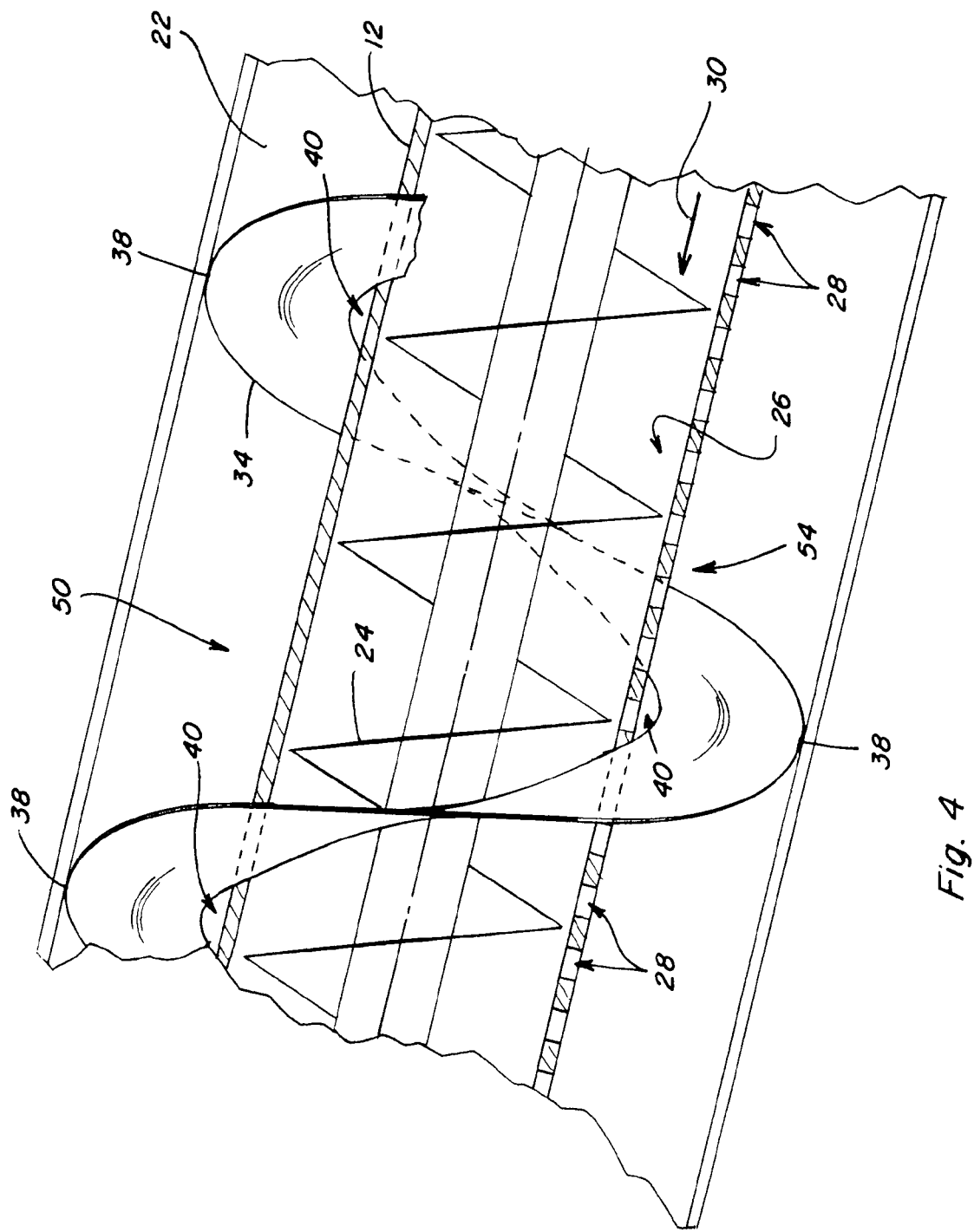
FIG. 4 is an enlarged partial side view of the grain conveying apparatus of FIG. 3.
Figure 5:
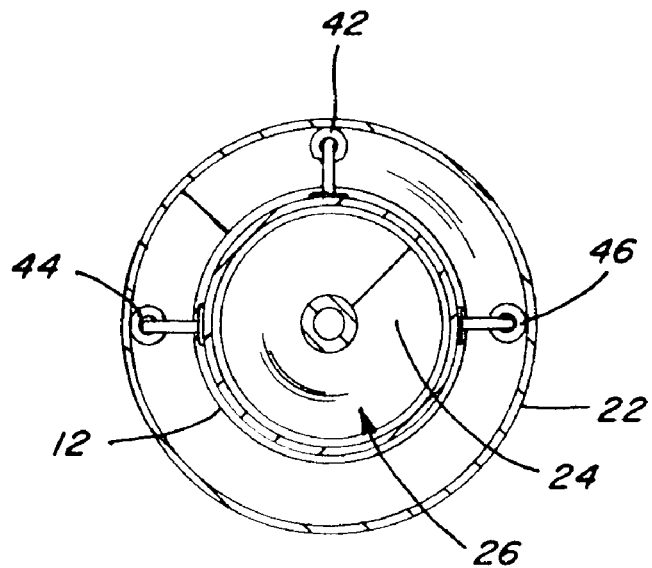
FIG. 5 is a cross sectional end view of the grain conveying apparatus of FIG. 3.

According to an aspect of the invention, helical auger 24 conveys the grain mixture over lower region 26 of unloading tube 12, and the second conveyance device includes a second helical auger 34 disposed about the first helical auger 24 as depicted in FIGS. 3-5. Second helical auger 34 may comprise a portion of the structure defining the lower passage or outer tube 22 illustrated by representative attachment points 38.

Referencing FIGS. 3-5, outer cylindrical tube 22 is concentric with inner, unloading tube 12 and coextensive in first direction 30 with at least a portion of unloading tube 12 including the at least one aperture 28. Outer tube 22 is configured and operable for rotating around unloading tube 12 as represented by an arrangement of supporting wheels 42, 44, 46 shown in FIG. 5. At least one helical flight of second auger 34 is disposed on an inner surface of outer tube 22, as illustrated in FIG. 4 by attachment points 38 to outer tube 22 and gaps 40 between auger 34 and unloading tube 12. Second auger 34 is configured and operable for conveying the elements of the grain mixture away from the at least one aperture 28, such that rotating outer tube 22 around unloading tube 12 will convey the elements of the grain mixture of the second maximum size, the grain, that have passed through the at least one aperture 28 in a second direction to second receiving bin 20.

According to a feature of the invention, lower region 26 of unloading tube 12 includes a plurality of apertures 28 of the first predetermined extent in at least one direction as illustrated in FIG. 4. With reference to FIGS. 2 and 3, the plurality of apertures 28 may form a perforated section 54 in lower region 26 of an intermediate portion 50 of unloading tube 12. Intermediate portion 50 extends between an inlet portion 48 proximate grain bin 16 and an outlet portion 52 proximate first receiving bin 18. After the grain mixture enters and passes through inlet portion 48, the rotation of helical auger 24 not only transports the grain mixture through the intermediate portion 50, it agitates or churns the elements of the grain mixture producing a tumbling effect to promote separation of the cob pieces and the grain. Intermediate portion 50 includes sufficient apertures 28 for exposing substantially all of the elements of the grain mixture of the second maximum size, the grain, to apertures 28 as the grain mixture tumbles or churns across the perforation created by the plurality of apertures 28 during conveyance through intermediate portion 50. Elements of the grain mixture of the first minimum size, the cob pieces, being larger than apertures 28 will pass over the perforation created by the plurality of apertures 28 to outlet portion 52.

According to another aspect of the invention, an extent in the first direction of inner, unloading tube 12 exceeds an extent in the first direction of outer tube 22. Accordingly, first receiving bin 18 will typically be further away from than the source bin than second receiving bin 20. Also, the extent in the first direction of outer tube 22 is greater than an extent in the first direction of perforated section 54 of unloading tube 12. This is desirable so grain passing through apertures 28 will collect in and be conveyed by outer tube 22 to second receiving bin 20. However, there may be situations in which this is not necessary because second receiving bin 20 may positioned below some or all of perforated section 54 to collect grain as it falls through apertures 28. In some situations, it is desirable for the extent of perforated section 54 to be as much as two thirds of the extent of unloading tube 12.

Figure 7:
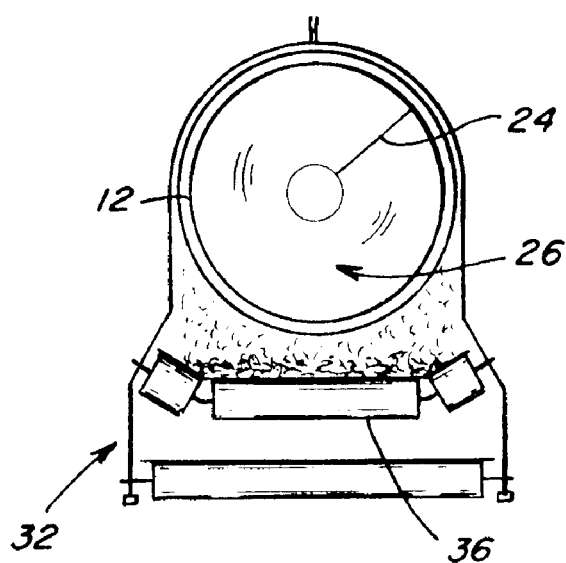
FIG. 7 is a cross sectional end view of the grain conveying apparatus of FIG. 6.
Figure 6:
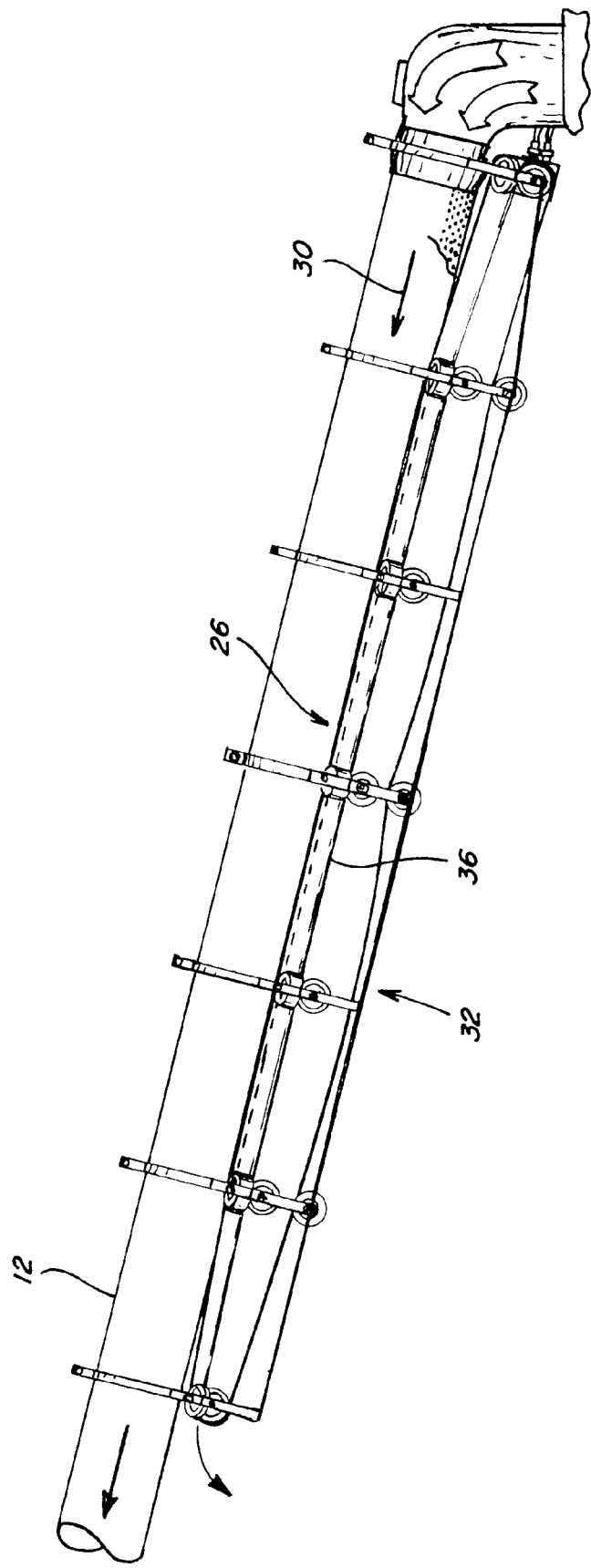
FIG. 6 is a partial side view of another preferred embodiment of the grain conveying apparatus of the present invention.

According to another preferred embodiment of the present invention, helical auger 24 conveys the grain mixture over lower region 26 of unloading tube 12, the lower passage includes a belt system 32, and the second conveyance device includes at least one belt 36 configured and operable for conveying the elements of the grain mixture that have passed through the at least one aperture 28 in a second direction away from the at least one aperture 28, as depicted in FIGS. 6-7.

Referencing FIGS. 6 and 7, belt system 32 may enclose at least a lower portion of unloading tube 12 including the at least one aperture 28. Enclosing the space between unloading tube 12 and belt 36 is advantageous because it protects grain passing through apertures 28 from loss.

For explanation purpose, the grain mixture has been shown conveyed towards tandem receiving bins 18, 20, making the second direction of conveyance in the lower passage the same as the first direction 30 of conveyance in the upper passage. However, the lower passage may also be configured to redirect the elements of the grain mixture that have passed through the at least one aperture 28, the grain, to a second receiving bin that may be situated to one side of the first receiving bin.

It is contemplated that the structures defining the passages and conveyance devices may include a variety of well known structures and devices, such as troughs, tubes, belts, rollers, augers, and the like, and those described hereinabove are exemplary rather than limiting. In addition, rotation of the outer tube around the inner tube may also be achieved using a number of known configurations including, but not limited to, belts, wheels, and the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A grain conveying apparatus for conveying and separating elements of a grain mixture of at least a first minimum size and a second maximum size smaller than the first minimum size, comprising:

a fixed structure having a length and defining an upper passage containing a first conveyance device which is not substantially connected to an inner surface of the fixed structure, the first conveyance device configured and operable for conveying the grain mixture in a first direction within the upper passage over a lower region of the upper passage including a plurality of apertures formed only through the lower region and extending the substantial length of the upper passage, the plurality of apertures of a first predetermined extent in at least one direction smaller than the first minimum size of large elements of the grain mixture and larger than the second maximum size of small elements of the grain mixture, such that substantially all of the large elements of the grain mixture of at least the first minimum size will be conveyed across the plurality of apertures and substantially all of the small elements of the grain mixture of the second maximum size will pass through the plurality of apertures; and structure defining a lower passage disposed in communication with the upper passage through the plurality of apertures and containing a second conveyance device configured and operable for conveying the small elements of the grain mixture that have passed through the plurality of apertures into the lower passage in a second direction away from the plurality of apertures.

2. The grain conveying apparatus of claim 1, wherein the first conveyance device comprises a first helical auger and the second conveyance device comprises a second helical auger disposed about the first helical auger.

3. The grain conveying apparatus of claim 2, wherein the second helical auger comprises a portion of the structure defining the lower passage.

4. The grain conveying apparatus of claim 1, wherein the fixed structure defining the upper passage comprises an inner cylindrical tube, the first conveyance device comprises a helical auger, the structure defining the lower passage comprises an outer cylindrical tube concentric with the inner tube and coextensive in the first direction with at least a portion of the inner tube including the plurality of apertures, the outer tube configured and operable for rotating around the inner tube, and the second conveyance device comprises at least one helical flight disposed on an inner surface of the outer tube configured and operable for conveying the small elements of the grain mixture away from the plurality of apertures, such that rotating the outer tube around the inner tube will convey the small elements of the grain mixture of the second maximum size that have passed through the plurality of apertures in the second direction.

5. The grain conveying apparatus of claim 4, wherein the plurality of apertures in the lower region of the upper passage of the fixed structure extend substantially between an inlet portion of the upper passage proximate the source bin and an outlet portion proximate the first receiving bin.

6. The grain conveying apparatus of claim 5, wherein an extent in the first direction of the inner tube exceeds an extent in the first direction of the outer tube.

7. The grain conveying apparatus of claim 1, wherein large elements of the grain mixture include cobs and cob pieces and small elements of the grain mixture include grain.

8. The grain conveying apparatus of claim 1, wherein the fixed structure defining the upper passage comprises an inner cylindrical tube, the first conveyance device comprises a helical auger, and the second conveyance device comprises at least one belt configured and operable for conveying the small elements of the grain mixture that have passed through the plurality of apertures into the lower passage away from the plurality of apertures.

9. The grain conveying apparatus of claim 8, wherein the structure defining the lower passage encloses at least a lower portion of the inner tube including the plurality of apertures.

10. The grain conveying apparatus of claim 9, wherein the plurality of apertures are sufficient for exposing substantially all of the small elements of the grain mixture of the second maximum size to the apertures as the helical auger rotates and agitates the grain mixture passing within the lower region.

11. A grain conveying system for conveying and separating elements of a grain mixture of at least a first minimum size and a second maximum size smaller than the first minimum size, the grain mixture originating from a source bin and separated elements of the grain mixture being conveyed to a first receiving bin and a second receiving bin, comprising:

a fixed structure defining an upper passage including an inlet portion proximate the source bin, an outlet portion proximate the first receiving bin, and an intermediate portion therebetween, the intermediate portion having a length between the inlet portion and the outlet portion, the intermediate portion including a lower region having a plurality of apertures formed only therethrough, the plurality of apertures extending the length of the lower region of the intermediate portion, the plurality of apertures having a first predetermined extent in at least one direction smaller than the first minimum size of large elements of the grain mixture and larger than the second maximum size of small elements of the grain mixture, the upper passage containing a first conveyance device which is not substantially connected to an inner surface of the fixed structure, the first conveyance device configured and operable for conveying the grain mixture in a first direction within the upper passage over the lower region, such that substantially all of the large elements of the grain mixture of at least the first minimum size will be conveyed across the plurality of apertures of the intermediate portion to the outlet portion for conveyance into the first receiving bin and substantially all of the small elements of the grain mixture of the second maximum size will pass through the plurality of apertures of the intermediate portion; and structure defining a lower passage disposed in communication with the upper passage through the plurality of apertures and containing a second conveyance device configured and operable for conveying the small elements of the grain mixture that have passed through the plurality of apertures into the lower passage to the second receiving bin.

12. The grain conveying system of claim 11, wherein the first conveyance device comprises a first helical auger and the second conveyance device comprises a second helical auger disposed about the first helical auger.

13. The grain conveying system of claim 12, wherein the second helical auger comprises a portion of the structure defining the lower passage.

14. The grain conveying system of claim 11, wherein the fixed structure defining the upper passage comprises an inner cylindrical tube, the first conveyance device comprises a helical auger, the structure defining the lower passage comprises an outer cylindrical tube concentric with the inner tube and coextensive in the first direction with at least the intermediate portion of the inner tube including the plurality of apertures, the outer tube configured and operable for rotating around the inner tube, and the second conveyance device comprises at least one helical flight disposed on an inner surface of the outer tube configured and operable for conveying the small elements of the grain mixture away from the plurality of apertures, such that rotating the outer tube around the inner tube will convey the small elements of the grain mixture of the second maximum size that have passed through the plurality of apertures to the second receiving bin.

15. The grain conveying system of claim 14, wherein the plurality of apertures in the lower region of the inner tube of the first predetermined extent in the at least one direction are sufficient for exposing substantially all of the small elements of the grain mixture of the second maximum size to the apertures as the helical auger rotates and agitates the grain mixture passing within the lower region.

16. The grain conveying system of claim 15, wherein an extent in the first direction of the inner tube exceeds an extent in the first direction of the outer tube.

17. The grain conveying system of claim 11, wherein large elements of the grain mixture include cobs and cob pieces and small elements of the grain mixture include grain.

18. The grain conveying system of claim 11, wherein the fixed structure defining the upper passage comprises an inner cylindrical tube, the first conveyance device comprises a helical auger, and the second conveyance device comprises at least one belt configured and operable for conveying the small elements of the grain mixture that have passed through the plurality of apertures into the lower passage away from the plurality of apertures.

19. The grain conveying system of claim 18, wherein the structure defining the lower passage encloses at least a lower portion of the inner tube including the plurality of apertures.

20. The grain conveying system of claim 19, wherein the plurality of apertures in the lower region of the inner tube of the first predetermined extent in the at least one direction are sufficient for exposing substantially all of the small elements of the grain mixture of the second maximum size to the plurality of apertures as the helical auger rotates and agitates the grain mixture passing within the lower region.

* * * * *